United States Patent
Lee et al.

(10) Patent No.: US 9,591,600 B2
(45) Date of Patent: Mar. 7, 2017

(54) METHOD FOR REPORTING TIMER STATUS INFORMATION IN WIRELESS COMMUNICATION SYSTEM AND AN APPARATUS THEREFOR

(71) Applicant: LG Electronics Inc., Seoul (KR)

(72) Inventors: Sunyoung Lee, Seoul (KR); Sunghoon Jung, Seoul (KR); Sungjun Park, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 1 day.

(21) Appl. No.: 14/647,541

(22) PCT Filed: Jan. 9, 2014

(86) PCT No.: PCT/KR2014/000241
§ 371 (c)(1),
(2) Date: May 27, 2015

(87) PCT Pub. No.: WO2014/112744
PCT Pub. Date: Jul. 24, 2014

(65) Prior Publication Data
US 2015/0312869 A1    Oct. 29, 2015

Related U.S. Application Data

(60) Provisional application No. 61/753,925, filed on Jan. 17, 2013.

(51) Int. Cl.
*H04W 4/00* (2009.01)
*H04W 56/00* (2009.01)
*H04L 1/18* (2006.01)
*H04W 8/22* (2009.01)
*H04W 88/02* (2009.01)
*H04W 88/08* (2009.01)

(52) U.S. Cl.
CPC ......... *H04W 56/004* (2013.01); *H04L 1/1812* (2013.01); *H04W 8/22* (2013.01); *H04W 56/0045* (2013.01); *H04W 88/02* (2013.01); *H04W 88/08* (2013.01)

(58) Field of Classification Search
USPC .................... 370/252, 395, 329, 333, 338
See application file for complete search history.

(56) References Cited

U.S. PATENT DOCUMENTS

| | | | |
|---|---|---|---|
| 2009/0279495 A1 | 11/2009 | Yoo | |
| 2010/0061361 A1 | 3/2010 | Wu | |
| 2010/0074202 A1 | 3/2010 | Park et al. | |
| 2010/0177747 A1 | 7/2010 | Chun et al. | |
| 2012/0257569 A1* | 10/2012 | Jang | H04L 5/001 370/328 |
| 2012/0257570 A1* | 10/2012 | Jang | H04L 1/1854 370/328 |

* cited by examiner

*Primary Examiner* — Zewdu A Beyen
(74) *Attorney, Agent, or Firm* — Dentons US LLP

(57) ABSTRACT

A method for reporting TAT (time alignment timer) status information at a user equipment (UE) in a wireless communication system is disclosed. The method includes a step of reporting the TAT status information for at least one TAG (time alignment group) to a network when a condition is met, wherein the TAT status information indicates whether the TAT for at least one TAG is running or not.

7 Claims, 12 Drawing Sheets

(a) Control-plane protocol stack (b) User-plane protocol stack

FIG. 9

| R | Timing Advance Command | | Oct 1 |
| Timing Advance Command | UL Grant | Oct 2 |
| UL Grant | Oct 3 |
| UL Grant | Oct 4 |
| Temporary C-RNTI | Oct 5 |
| Temporary C-RNTI | Oct 6 |

FIG. 10

| TAG Id | Timing Advance Command | Oct 1 |

METHOD FOR REPORTING TIMER STATUS INFORMATION IN WIRELESS COMMUNICATION SYSTEM AND AN APPARATUS THEREFOR

This application is a 35 USC §371 National Stage entry of International Application No. PCT/KR2014/00241 filed on Jan. 9, 2014, and claims priority to U.S. Provisional Application No. 61/753,925 filed on Jan. 17, 2013, all of which are hereby incorporated by reference in their entireties as if fully set forth herein.

TECHNICAL FIELD

The present invention relates to a wireless communication system and, more particularly, to a method for reporting timer status information in a wireless communication system and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARM)-related information. In addition, the eNB transmits uplink scheduling information with respect to uplink data to a corresponding UE to inform the UE of an available time/frequency domain, coding, data size, and HARQ-related information. An interface may be used to transmit user traffic or control traffic between eNBs. A Core Network (CN) may include the AG, a network node for user registration of the UE, and the like. The AG manages mobility of a UE on a Tracking Area (TA) basis, each TA including a plurality of cells.

Although radio communication technology has been developed up to LTE based on Wideband Code Division Multiple Access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simple structure, open interface, and suitable power consumption by a UE are required.

DISCLOSURE

Technical Problem

Based on the above discussion, the present invention proposes a method for reporting timer status information in a wireless communication system and an apparatus therefor.

Technical Solution

In accordance with an embodiment of the present invention, a method for reporting TAT (time alignment timer) status information at a user equipment (UE) in a wireless communication system includes reporting the TAT status information for at least one TAG (time alignment group) to a network when a condition is met, wherein the TAT status information indicates whether the TAT for at least one TAG is running or not.

Here, the condition comprises a reception of a command for reporting the TAT status information, or the condition comprises an expiration of the TAT for a specific TAG, or the condition comprises a predetermined time before the expiration of the TAT. Further, the condition can comprise a reception of information on TAC (Timing Advance Command).

Preferably, the TAT status information for the at least one TAG includes a TAG identity of the at least one TAG. Further, reporting the TAT status information comprises reporting the TAT status information periodically.

More preferably, the at least one TAG is all TAGs configured for the UE.

Preferably, each of the at least one TAG comprises one or more serving cells configured for the UE.

More preferably, said method may further comprise a step of receiving information on the condition from the network.

It is to be understood that both the foregoing general description and the following detailed description of the present invention are exemplary and explanatory and are intended to provide further explanation of the invention as claimed.

Advantageous Effects

According to embodiments of the present invention, the network and the user equipment can efficiently apply a TAT (time alignment timer) in the wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIGS. 9 and 10 are diagrams showing the structure for transmitting a timing advance command (TAC).

BEST MODE

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
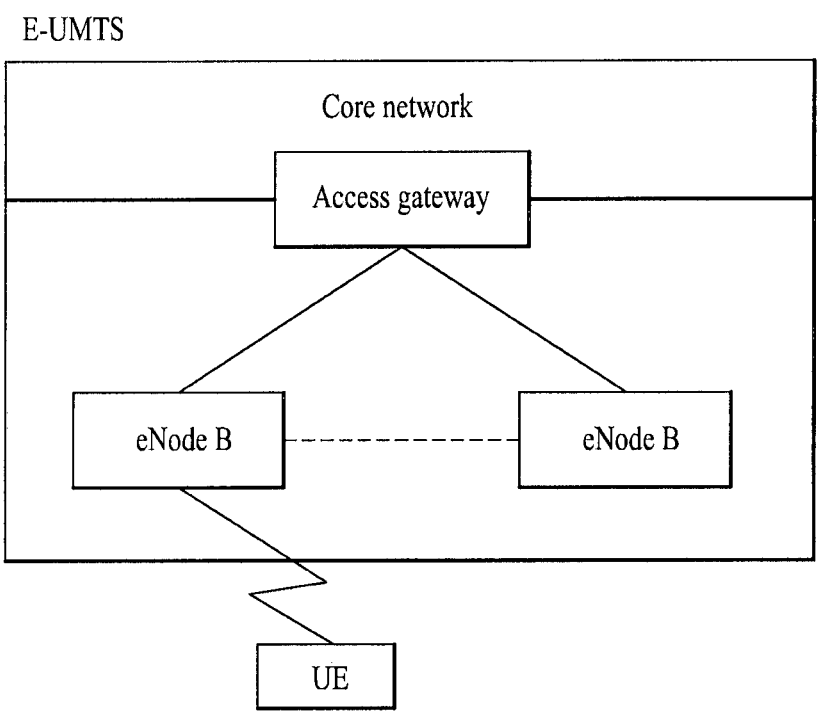
FIG. 1 is a diagram showing a network structure of an Evolved Universal Mobile Telecommunications System (E-UMTS) as an example of a wireless communication system.
Figure 2:
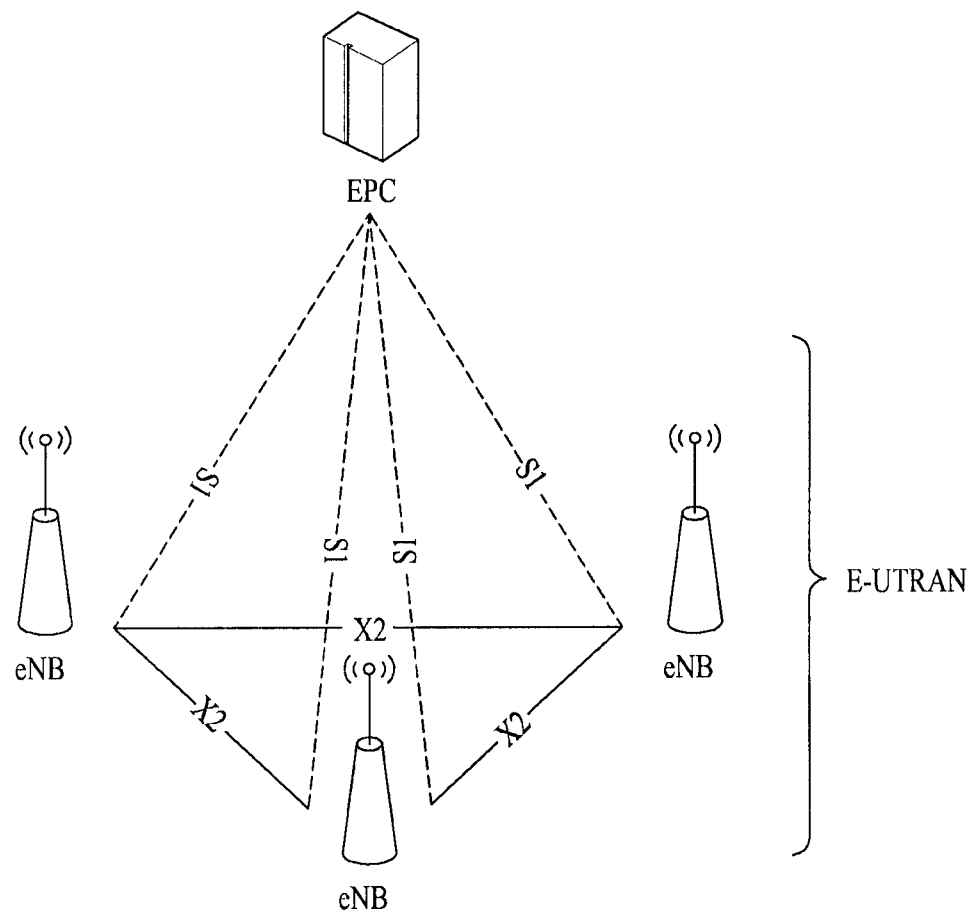
FIG. 2 is a diagram showing the concept of a network structure of an Evolved Universal Terrestrial Radio Access Network (E-UTRAN).

FIG. 2 is a diagram showing the concept of a network structure of an Evolved Universal Terrestrial Radio Access Network (E-UTRAN). In particular, the E-UTRAN system is a system evolved from the existing UTRAN system. The E-UTRAN includes cells (eNBs) and cells are connected via an X2 interface. A cell is connected to a user equipment (UE) via an air interface and is connected to an evolved packet core (EPC) via an S1 interface.

The EPC includes a mobility management entity (MME), a serving-gateway (S-GW) and a packet data network-gateway (PDN-GW). The MME has access information of a UE and information about capabilities of the UE. Such information is mainly used for mobility management of the UE. The S-GW is a gateway having an E-UTRAN as an end point and the PDN-GW is a gateway having a PDN as an end point.

Figure 3:
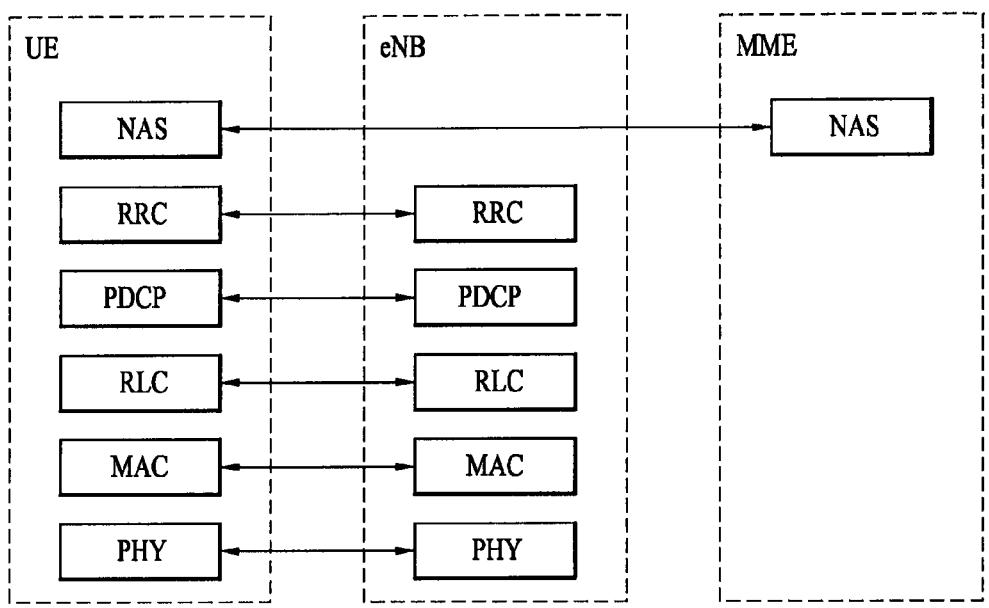
FIG. 3 is a diagram showing a control plane and a user plane of a radio interface protocol between a User Equipment (UE) and an Evolved Universal Terrestrial Radio Access Network (E-UTRAN) based on a 3rd Generation Partnership Project (3GPP) radio access network standard.
Figure 3:
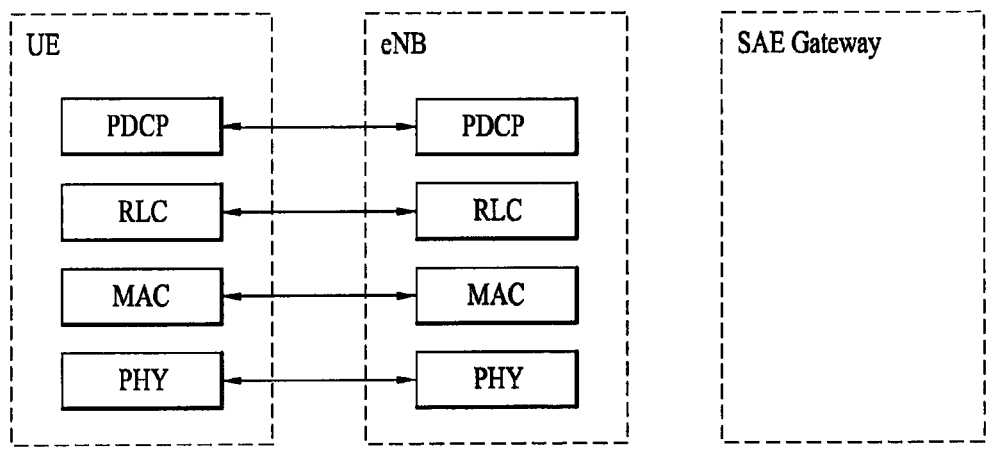

FIG. 3 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A medium access control (MAC) layer, a radio link control (RLC) layer and a packet data convergence protocol (PDCP) layer may be located in a second layer. The MAC layer of the second layer serves to map various logical channels to various transport channels. The MAC layer performs a logical channel multiplexing function for mapping several logical channels to one transport channel. The MAC layer is connected to a Radio Link Control (RLC) layer, which is a higher layer, via a logical channel, and the logical channel may be roughly divided into a control channel for transmitting information about the control plane and a traffic channel for transmitting information about the user plane, according to the type of transmitted information.

The RLC layer of the second layer segments and concatenates data received from a higher layer, thereby controlling a data size suitable for enabling a lower layer to transmit data in a radio interval. The RLC layer provides three modes, namely, a transparent mode (TM), an unacknowledged mode (UM) and an acknowledged mode (AM) to support a variety of QoS requested by each radio bearer (RB). Especially, for reliable data transmission, the AM RLC performs a function to retransmit data through automatic repeat request (ARQ).

The packet data convergence protocol (PDCP) layer of the second layer performs a header compression function for reducing the size of an IP packet header which is relatively great in size and includes unnecessary control information in order to efficiently transmit IP packets, such as IPv4 or IPv6 packets, in a radio interval with a relatively narrow bandwidth. Accordingly, only necessary information need be included in the header part of data for transmission, so as to increase transmission efficiency of a radio interval. In the LTE system, the PDCP layer also performs a security function. The security function includes a ciphering function for preventing data monitoring from a third party, and an integrity protection function for preventing third party data manipulation.

A radio resource control (RRC) layer of the third layer is defined only in the control plane. The RRC layer handles logical channels, transport channels and physical channels for the configuration, re-configuration and release of radio bearers (RBs). Here, a radio bearer (RB) denotes a service provided by the second layer for data transfer between the UE and the network. The RRC layers of the UE and the network exchange RRC messages with each other.

The RB may be broadly divided into two bearers, that is, a signaling radio bearer (SRB) used to transmit an RRC message on a control plane and a data radio bearer (DRB) used to transmit user data on a user plane. The DRB may be divided into a UM DRB using UM RLC and AM DRB using AM RLC according to method for operating RLC.

Hereinafter, an RRC state of a UE and an RRC connection method will be described. The RRC state, which indicates whether the RRC layer of the UE is logically connected to the RRC layer of the E-UTRAN, is called an RRC_CONNECTED state if the RRC layers are connected and is called an RRC_IDLE state if the RRC layers are not connected.

Since the E-UTRAN detects presence of a UE in an RRC_CONNECTED state in cell units, it is possible to efficiently control the UE. In contrast, the E-UTRAN cannot detect a UE in an RRC_IDLE state in cell units and a core network (CN) manages the UE in an RRC_IDLE state in units of TA which is greater than a cell. That is, the UE in the RRC_IDLE state transitions to the RRC_CONNECTED state in order to receive a service such as voice or data from a cell.

In particular, when a user first turns a UE on, the UE searches for an appropriate cell and then camps on an RRC_IDLE state in the cell. The UE in the RRC_IDLE state performs an RRC connection establishment process with the RRC layer of the E-UTRAN to transition to the RRC_CONNECTED state when RRC connection needs to be established. The RRC connection needs to be established when uplink data transmission is necessary due to call connection attempt of a user, when a response message is transmitted in response to a paging message received from the E-UTRAN, etc.

A non-access stratum (NAS) layer located above the RRC layer performs a function such as session management and mobility management. In the NAS layer, two states such as an EPS mobility management-REGISTERED (EMM-REGISTERED) state and an EMM-UNREGISTERED state are defined in order to manage mobility of a UE. These two states are applied to the UE and the MME. A UE is first in the EMM-UNREGISTERED state and performs a process of registering with a network through an initial attach procedure in order to access the network. If the attach procedure is successfully performed, the UE and the MME enter the EMM-REGISTERED STATE.

In the NAS layer, in order to manage signaling connection between the UE and the EPC, an EPS connection management (ECM)-IDLE state and an ECM_CONNECTED state are defined and applied to the UE and the MME. If a UE in the ECM-IDLE state is RRC connected to the E-UTRAN, the UE enters the ECM-CONNECTED state. If the MME in the ECM-IDLE state is S1 connected to the E-UTRAN, the MME enters the ECM-CONNECTED state.

When the UE is in the ECM-IDLE state, the E-UTRAN does not have context information of the UE. Accordingly, the UE in the ECM-IDLE state performs a UE-based mobility associated procedure, such as cell selection or reselection, without receiving a command of the network. In contrast, if the UE is in the ECM-CONNECTED state, mobility of the UE is managed by the command of the network. If the location of the UE is changed in the ECM-IDLE state, the UE informs the network of the location thereof via a tracking area (TA) update procedure.

In an LTE system, one cell configuring an eNB is configured to use a bandwidth such as 1.25, 2.5, 5, 10, 15 or 20 MHz to provide a downlink or uplink transmission service to several UEs. Different cells may be configured to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH).

Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 4:
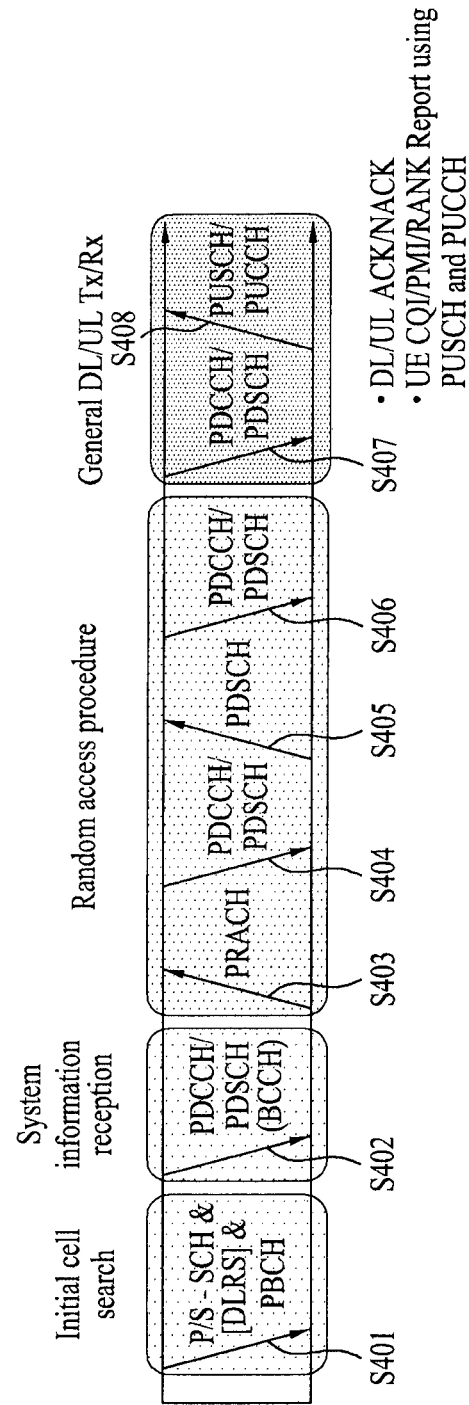
FIG. 4 is a diagram showing physical channels used in a 3GPP system and a general signal transmission method using the same.

FIG. 4 is a diagram showing physical channels used in a 3GPP system and a general signal transmission method using the same.

A UE performs an initial cell search operation such as synchronization with an eNB when power is turned on or the UE enters a new cell (S401). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which has completed the initial cell search may receive a Physical Downlink Control Channel (PDCCH) and a Physical Downlink Shared Channel (PDSCH) according to information included in the PDCCH so as to acquire more detailed system information (S402).

Meanwhile, if the eNB is initially accessed or radio resources for signal transmission are not present, the UE may perform a Random Access Procedure (RACH) (step S403 to S406) with respect to the eNB. In this case, the UE may transmit a specific sequence through a Physical Random Access Channel (PRACH) as a preamble (S403), and receive a response message to the preamble through the PDCCH and the PDSCH corresponding thereto (S404). In case of contention based RACH, a contention resolution procedure may be further performed.

The UE which has performed the above procedures may perform PDCCH/PDSCH reception (S407) and Physical Uplink Shared Channel PUSCH)/Physical Uplink Control Channel (PUCCH) transmission (S408) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In case of the 3GPP LTE system, the UE may transmit the control information such as CQI/PMI/RI through the PUSCH and/or the PUCCH.

Figure 5:
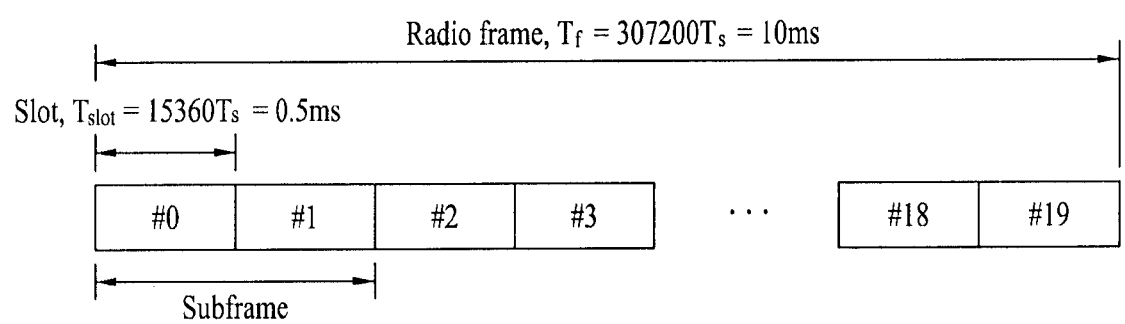
FIG. 5 is a diagram showing the structure of a radio frame used in a Long Term Evolution (LTE) system.

FIG. 5 is a diagram showing the structure of a radio frame used in a Long Term Evolution (LTE) system.

Referring to FIG. 5, the radio frame has a length of 10 ms ($327200 \times T_s$) and includes 10 subframes with the same size. Each subframe has a length of 1 ms and includes two slots. Each slot has a length of 0.5 ms ($15360 \times T_s$). $T_s$ denotes a sampling time, and is represented by $T_s=1/(15 \text{ kHz} \times 2048)= 3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Hereinafter, a random access procedure will be described in greater detail.

The UE may perform a random access procedure in the following cases:

when the UE performs initial access because RRC connection with the eNB is not established, when the UE initially accesses a target cell in a handover procedure, when the random access procedure is requested by a command of a base station, when uplink data transmission is performed in a situation in which uplink time synchronization is not performed or in a situation in which specific radio resources used for requesting radio resources are not allocated, and when a recovery procedure is performed in case of a radio link failure or a handover failure.

In the LTE system, a non-contention based random access procedure of, at an eNB, allocating a dedicated random access preamble to a specific UE and, at the UE, performing the random access procedure using the random access preamble is provided. In other words, there are two procedures in selection of a random access preamble: one is a contention based random access procedure in which the UE randomly selects one preamble within a specific group for use, another is a non-contention based random access procedure in which a random access preamble allocated only to a specific UE by the eNB is used. The above-described random access procedures are performed differently in contention occurring due to competition as will be described below. The non-contention based random access procedure may be used, as described above, only in the handover procedure or when the random access procedure is requested by the eNB.

In the contention based random access procedure, the UE randomly selects one random access preamble from a set of random access preambles indicated via system information or a handover command and selects and transmits PRACH resources for transmitting the random access preamble.

The UE attempts to receive a random access response thereof within a random access response reception window indicated by the eNB via system information or a handover command, after transmitting the random access preamble. More specifically, the random access response information is transmitted in the form of a MAC PDU and the MAC PDU is delivered via a PDSCH. In addition, in order to enable the UE to appropriately receive the information delivered via the PDSCH, a PDCCH is also delivered. That is, the PDCCH includes information about the UE which will receive the PDSCH, frequency and time information of radio resources of the PDSCH and a transmission format of the PDSCH.

Once the UE has successfully received the PDCCH, the UE appropriately receives the random access response transmitted via the PDSCH according to the information about the PDCCH. The random access response includes a random access preamble identifier, uplink grant, a temporary cell identifier (C-RNTI) and timing advance commands (TACs). The reason why the random access preamble identifier is necessary is because random access response information for one or more UEs is included in one random access response and thus for which UE the uplink grant, temporary C-RNTI and TACs are valid should be indicated. The random access preamble identifier matches the random access preamble selected by the UE.

If the UE has received a valid random access response, the UE processes information included in the random access response. That is, the UE applies the TAC and stores the temporary C-RNTI. In addition, the UE transmits data stored in the buffer of the UE or newly generated data to the eNB using the uplink grant. The identifier of the UE is necessarily included in data included in the uplink grant. In the contention based random access procedure, the eNB cannot determine which UE performs the random access procedure. However, for future contention resolution, the UE should be identified. In addition, there are two methods including the identifier of the UE.

In the first method, if a UE has a valid cell identifier allocated by a cell before the random access procedure, the UE transmits a cell identifier thereof in uplink. In contrast, if the UE is not allocated a valid cell identifier before the random access procedure, the UE transmits a unique identifier (e.g., S-TMSI or random id). In general, the unique identifier is longer than the cell identifier. If the UE transmits data via the UL grant, a contention resolution timer starts.

The UE transmits data including the identifier thereof via the uplink grant included in the random access response and then waits for an instruction of the eNB for contention resolution. That is, in order to receive a specific message, the UE attempts to receive a PDCCH. The method of receiving the PDCCH includes two methods. As described above, if the identifier transmitted via the uplink grant is a cell identifier, the UE attempts to receive the PDCCH using the cell identifier and, if the identifier is a unique identifier, the UE attempts to receive the PDCCH using the temporary C-RNTI included in the random access response.

Thereafter, in the former case, if the PDCCH is received via the cell identifier before the contention resolution timer has elapsed, the UE determines that the random access procedure has been normally performed and completes the random access procedure. In the latter case, if the PDCCH is received via the temporary cell identifier before the contention resolution timer has elapsed, data delivered via the PDSCH indicated by the PDCCH is checked. If the unique identifier of the UE is included in the data, the UE determines that the random access procedure has been normally performed and completes the random access procedure.

Additionally, unlike the contention based random access procedure, in the non-contention based random access procedure, when the random access response information is received, the UE determines that the random access procedures has been normally performed and completes the random access procedure.

As described above, the non-contention based random access procedure may be performed in a handover process or when the random access procedure is requested by a command of the eNB. Of course, the contention based random access procedure may be performed in a handover process or when the random access procedure is requested by a command of the eNB. First, for the non-contention based random access procedure, it is important to receive, from the eNB, a predetermined random access preamble which does not cause contention. In the method of receiving the random access preamble, a handover command and a PDCCH command may be used. The UE receives the random access preamble allocated thereto from the eNB and then transmits the preamble to the eNB.

The method of receiving the random access response information is equal to that of the contention based random access procedure.

Hereinafter, a carrier aggregation (CA) scheme of an LTE-A system will be described.

Figure 6:
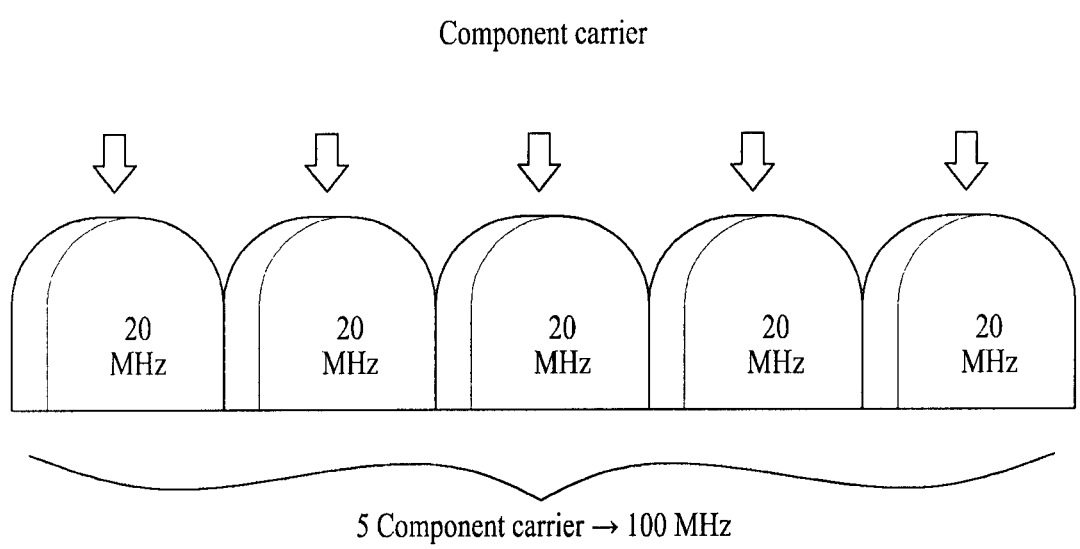
FIG. 6 is a diagram showing the concept of a carrier aggregation (CA) scheme of an LTE-A system.

FIG. 6 is a diagram showing the concept of a carrier aggregation (CA) scheme of an LTE-A system.

The LTE-A standard is a candidate of IMT-Advanced technology of the international telecommunication union (ITU) and is designed to satisfy requirements of IMT-Advanced technology of ITU. Accordingly, in LTE-A, in order to satisfy requirements of ITU, extension of bandwidth of an LTE system has been discussed. In order to extend bandwidth in the LTE-A system, a carrier of an LTE system is defined as a component carrier (CC) and a maximum of 5 CCs are combined and used. For reference, a serving cell may be composed of one downlink CC and one uplink CC. Alternatively, the serving cell may be composed of one downlink CC. Since the CC may have a maximum bandwidth of 20 MHz as in the LTE system, bandwidth may be extended to a maximum of 100 MHz. Technology for combining and using a plurality of CCs is referred to as CA.

If a CA scheme is applied, only one RRC connection is established between a UE and a network. Among a plurality of serving cells configured to be used by a UE, a serving cell for providing mobility information of a NAS layer and security input in order to establish or re-establish an RRC connection is referred to as a primary serving cell (PCell) and the other cells are referred to as secondary serving cells (SCells).

Figure 7:
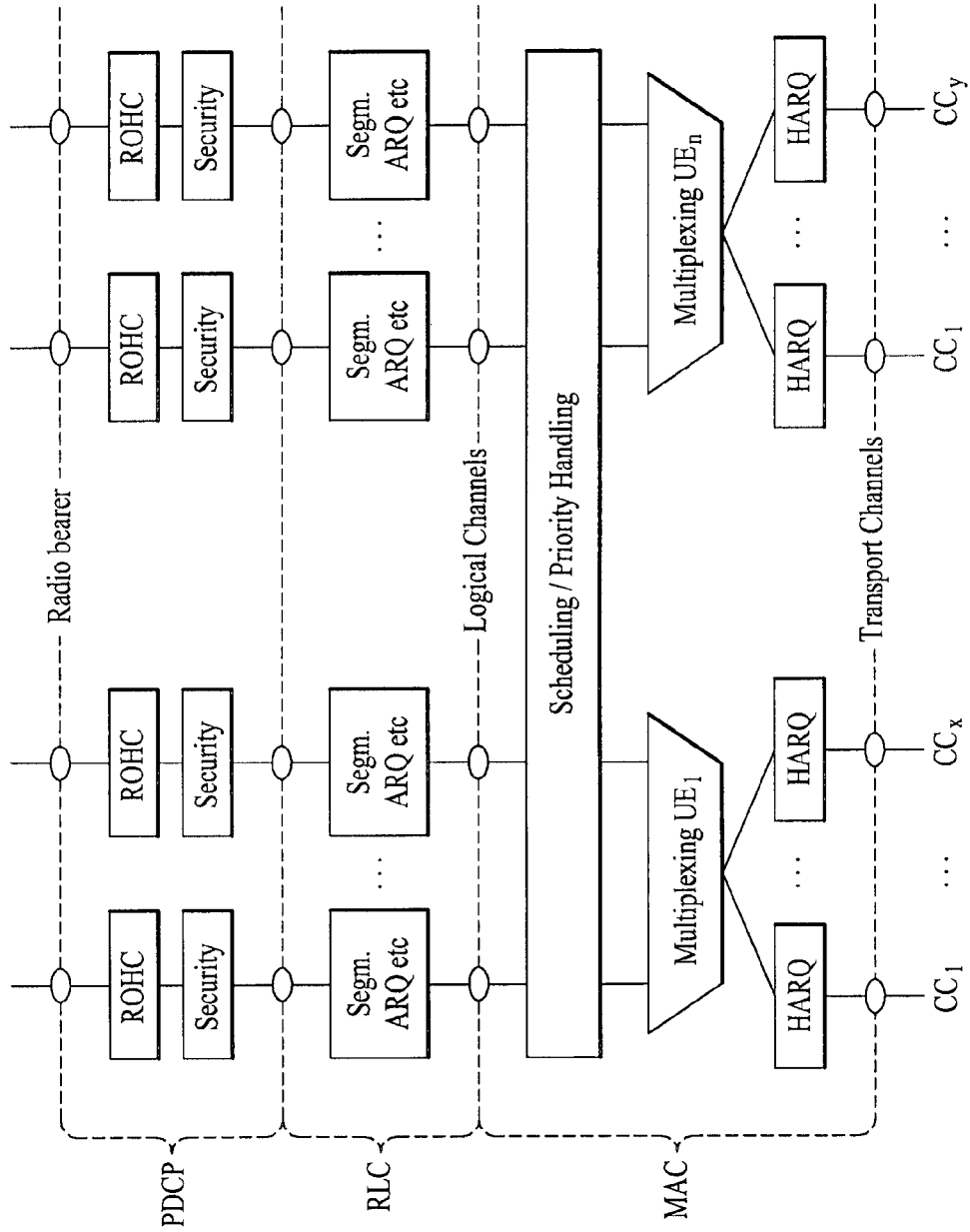
FIGS. 7 and 8 are diagrams showing the structure of a second downlink layer and a second uplink layer in case of applying a CA scheme.
Figure 8:
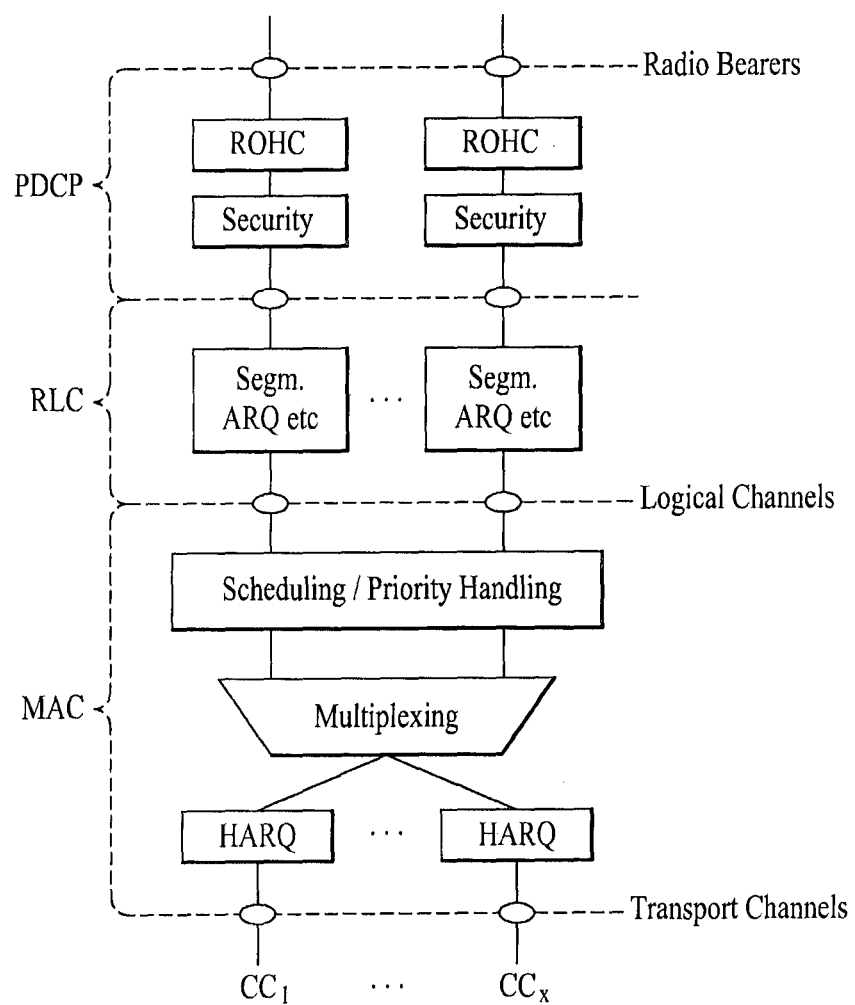

FIGS. 7 and 8 are diagrams showing the structure of a second downlink layer and a second uplink layer in case of applying a CA scheme.

Referring to FIGS. 7 and 8, the CA scheme influences a second layer and, more particularly, an MAC layer. For example, in CA, since a plurality of CCs is used and one HARQ entity manages one CC, an MAC layer of an LTE-A system should perform operations related to a plurality of HARQ entities. In addition, since transport blocks are independently processed, HARQ entities may transmit or receive a plurality of transport blocks at the same time via a plurality of CCs in CA.

Next, timing advance maintenance of uplink in an LTE system will be described.

In an OFDM based LTE system, a time when a signal transmitted by a UE reaches an eNB may change according to cell radius, a location of a UE within a cell and a speed of a UE. That is, unless an eNB manages transmission timing of each UE, a signal transmitted by the UE may interfere with a signal transmitted by another UE and thus a probability that errors occur in a signal received by the eNB is increased.

More specifically, a time when a signal transmitted by a UE located at a cell edge reaches an eNB is longer than a time when a signal transmitted by a UE located at a cell center reaches the eNB. In contrast, the time when the signal transmitted by the UE located at the cell center reaches the eNB is relatively shorter than the time when the signal transmitted by the UE located at the cell edge reaches the eNB.

Since the eNB should receive data or signals from all UEs within the cell for every valid time in order to prevent interference, the eNB should appropriately control transmission timing of the UE according to the state of the UE and such control is referred to as timing advance maintenance.

As one timing advance maintenance method, random access operation may be used. That is, the eNB receives a random access preamble from the UE via the random access operation and calculates a timing advance value for advancing or delaying transmission timing of the UE using the received random access preamble. The eNB signals the timing advance value to the UE via a random access response and the UE updates uplink transmission timing using the timing advance value.

As another method, the eNB periodically or randomly receives a sounding reference signal (SRS) from the UE, calculates the timing advance value of the UE via the received signal and signals the timing advance value to the UE. Thus, the UE updates the transmission timing thereof.

As described above, the eNB measures the transmission timing of the UE via the random access preamble or the SRS, calculates a timing value to be corrected and signal the timing value to be corrected to the UE. The timing advance value (that is, the timing value to be corrected) transmitted from the eNB to the UE is referred to as a timing advance command (TAC). The TAC is transmitted by including a Random Access Response (RAR) in case of the random access operation or by including an independent MAC Control Element (CE) in another case.

FIGS. 9 and 10 are diagrams showing the structure for transmitting a timing advance command (TAC).

In case of that the TAC is included in the RAR, an accurate adjustment of the transmission timing are required since the UE has not yet obtained the transmission timing. Therefore, the TAC having a size of 11 bits is transmitted shown as FIG. 9. But, in another case, since the UE has already obtained the transmission timing, the TAC having a size of 8 bits is transmitted shown as FIG. 10.

Since the UE is not fixed, the transmission timing of the UE is changed according to the speed and location of the UE.

Once the UE receives the timing advance command from the eNB, assume that the timing advance command is valid only for a specific time. Thus, a timeAlignmentTimer (TAT) is used. That is, when the UE receives the TAC from the eNB, the TAT starts. Only while the TAT operates, assume that the uplink timing of the UE matches that of the eNB. The value of the timing advance timer may be delivered via an RRC signal such as system information or radio bearer reconfiguration. In addition, if the UE has received a new timing advance command from the eNB while the TAT operates, the timing advance timer restarts. If the TAT has elapsed or if the TAT does not operate, the UE assumes that uplink timing of the UE does not match that of the eNB and does not transmit any uplink signal, e.g., a PUSCH and PUCCH signal except for the random access preamble.

Next, Timing Advance Group (TAG) in the carrier aggregation (CA) scheme will be described.

In the CA scheme, each of serving cells can have different frequency characteristic. If the uplink transmission is performed although the transmission timing for the serving cells are not obtained, inter-cell interference may be occurred. Therefore, a plurality of timing advance maintenance should be required.

If the UE uses a plurality of the serving cells, there are serving cells having similar timing synchronization characteristic based on the frequency characteristic. For example, the serving cells within a same frequency band may have similar timing synchronization characteristic.

In the CA scheme, in order to optimize signaling for adjusting multiple uplink timing synchronizations, the serving cells having similar timing synchronization characteristic are grouped and referred to as a TAG (Timing Advance Group).

Figure 11:
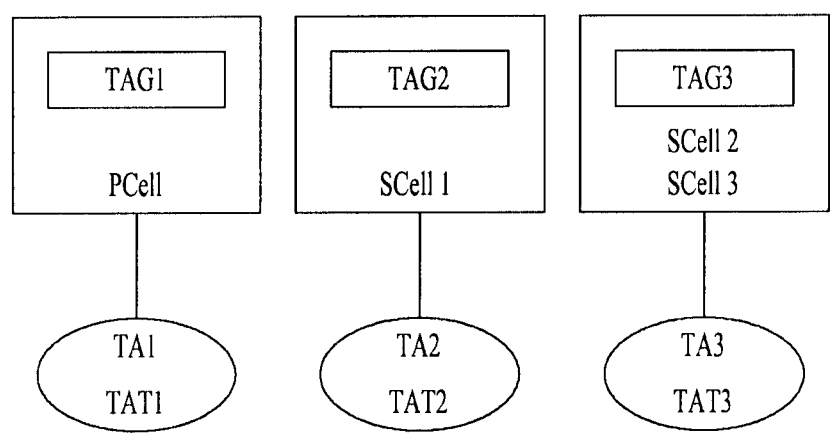
FIG. 11 is a diagram showing the concept of TAG (Timing Advance Group).

FIG. 11 is a diagram showing the concept of TAG (Timing Advance Group).

Referring to FIG. 11, the eNB transmits information about which TAG each of the serving cells are included in, via TAG-Id of a RRC layer signaling. Especially, referring to FIG. 10, the TAC MAC CE includes a TAG ID field having a size of 2 bits, which indicates to which TAG the TAC is applied. The TAG-Id may have a value from 0 to the maximum number of TAGs which can be configured to a UE. One UE can have at least two TAGs. The TAG-Id having 0 indicates pTAG including a primary serving cell.

At least one serving cell of a plurality of serving cells included in one TAG should have an uplink connection. Further, there may be two or more serving cells having similar timing synchronization characteristic in a same TAG.

Furthermore, the UE manages the uplink transmission timing for each of the TAGs. Therefore, independent TATs are operated in the plurality of TAGs. That is, all serving cells included in same TAG are applied to a same uplink transmission timing adjustment. If the TAT is expired, any uplink transmission cannot be performed via the serving cells included in said TAG except for transmitting the random access preamble.

If the UE uses a plurality of the serving cells, when adjusting the uplink transmission timing, following rules should be applied.

Each of TAGs can have different TATs.

The TAG including a primary serving cell is pTAG (primary TAG), and the TAG comprising only secondary serving cells is sTAG (secondary TAG).

When the uplink transmission timing is firstly obtained for a secondary serving cells included in the sTAG, a random access procedure can be initialized by only an order of the eNB. That is, although the uplink transmission is necessary, the random access procedure cannot be started without any order of the eNB.

If the TAT corresponding to pTAG is not operated, other TATs corresponding to all of the sTAGs cannot be operated.

When the UE is configured with multiple sCells and TAGs, the sCells in TAG are considered as uplink timing synchronized while the associated TAT of the TAG is running. The UE starts the TAT of the associated TAG when the UE receives a TAC MAC CE from the eNB. Accordingly, the eNB sends the TAC MAC CE to maintain the sCells in uplink timing synchronized status.

The eNB is in charge of uplink timing control for the sCells, but there is a case that the eNB has different understanding about actual uplink timing synchronization status of the sCells. For example, the eNB transmits the TAC MAC CE, but the UE does not successfully receive it. In this case, the eNB considers that the TAT associated with the TAG indicated by the TAC Command MAC CE restarts, but from the UE side, the TAT is to expire. Consequently, the UE unwantedly flushes all HARQ buffers and notifies RRC to release SRS for the sCells associated with that TAG.

Conventionally, there is no mechanism that the eNB confirms whether the TAT for the TAG is running or not.

In this invention, in order to provide the eNB with the uplink timing synchronization status information of sCells, the UE reports to the eNB the information of the TAT status of the TAG by using a MAC signaling. The TAT status can be "running" or "not running". From the eNB side, the eNB can configure the UE to report by using an RRC signaling or a MAC signaling including the reporting type, reporting criterion, or one or more TAG identifiers.

The reporting type can be either "immediate" or "by criterion". It is possible that reporting type is not included in the configuration, and in this case default type to apply is pre-set to either of "immediate" or "by criterion".

When the UE receives the RRC/MAC signaling that configures the UE with the reporting type of "immediate", the UE immediately reports the TAT status upon reception of it. But, when the UE receives the RRC/MAC signaling that configures the UE with the reporting type of "by criterion", the UE reports the TAT status when the reporting criterion is met.

When UE receives the TAT status reporting configuration that includes one or more TAG identifiers, the UE considers that TATs associated with the TAGs indicated by the TAG identifier are subject to status reporting. When UE receives the TAT status reporting configuration without TAG identifier, the UE considers that the all TATs associated with the TAGs configured to the UE are subject to status reporting.

The reporting criterion can be set as follows.

Periodicity of reporting, where the periodicity is defined by the time duration, the number of subframes, or TTI.

Event of reporting: i) when the UE receives the TAC MAC CE from the eNB, ii) when any of the concerned TATs subject to status reporting expires, or iii) when any of the concerned TATs subject to status reporting is supposed to expire in N subframes or N TTIs, where N is configurable or predefined value.

When the UE receives the RRC/MAC signaling that configures the UE to report the TAT status, the UE sends the TAT status for the corresponding TAG at the reporting moment.

When the UE reports the TAT status to the eNB, the UE can report only the TAT status of the indicated TAG, or the TAT status of all the configured TAGs. If the UE reports to the eNB only the TAT status of the indicated TAG, the UE sends the MAC signaling that contains additional information such as a) the TAT status of "running" or "not running" and b) TAG identifier.

If the UE reports to the eNB the TAT status of all the configured TAGs, the UE sends the MAC signaling that contains additional information such as a bitmap which indicates TAT status of the corresponding TAG. The bitmap is set to 1 to indicate that the TAT of the corresponding TAG is running and 0 to indicate the TAT of the corresponding TAG is not running.

Figure 12:
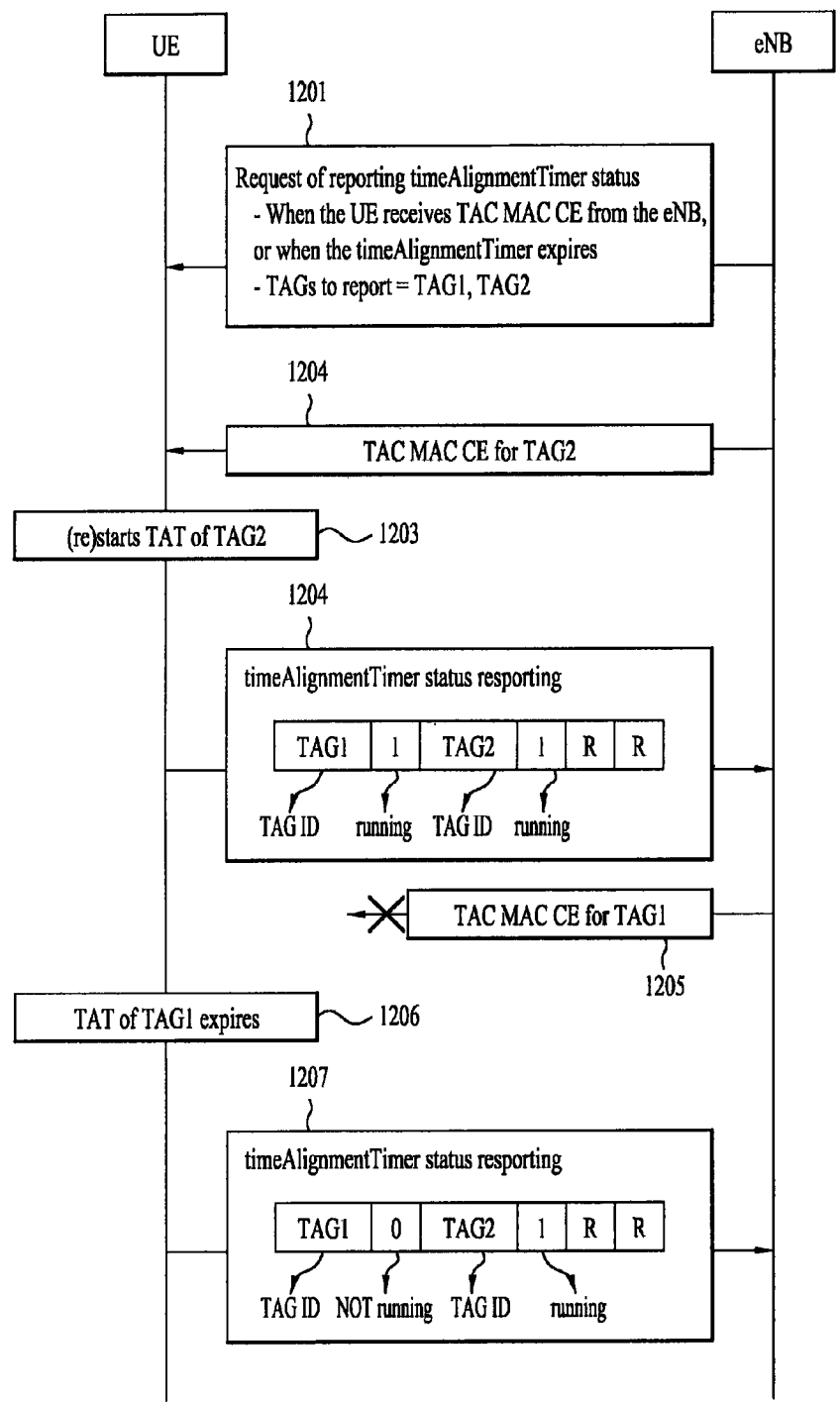
FIG. 12 is a flow chart for reporting the TAT status information corresponding to a plurality of TAGs according to the present invention.

FIG. 12 is a flow chart for reporting the TAT status information corresponding to a plurality of TAGs according to the present invention. Especially, in FIG. 12, it is shown that the UE is requested to report the TAT status of all indicated TAGs upon receiving TAC MAC CE from the eNB or upon expiry of any TAT.

Referring to FIG. 12, the UE is configured with two TAGs: TAG1 and TAG2. And, in S1201, the eNB requests to the UE to report the TAT status of TAG1 and TAG2 upon receiving TAC MAC CE from the eNB or upon expiry of any TAT.

In S1202, the eNB sends TAC MAC CE for the TAG2, and the UE successfully receives it. Then, the UE (re)starts the TAT associated with TAG2 in S1203, and sends the TAT status reporting including the identifier of TAG1, TAG2, and the corresponding TAT status in S1204. Here, all the timers are running.

But, the eNB sends TAC MAC CE for the TAG1 in S1205, but the UE cannot receive it. Hence, the UE does not (re)start the TAT of TAG1.

Therefore, the TAT associated with TAG1 may expire in S1206. But, to the present invention, the UE sends the TAT status reporting including the identifier of TAG1, TAG2, and the corresponding TAT status. Here, the timer of TAG1 is not running.

Figure 13:
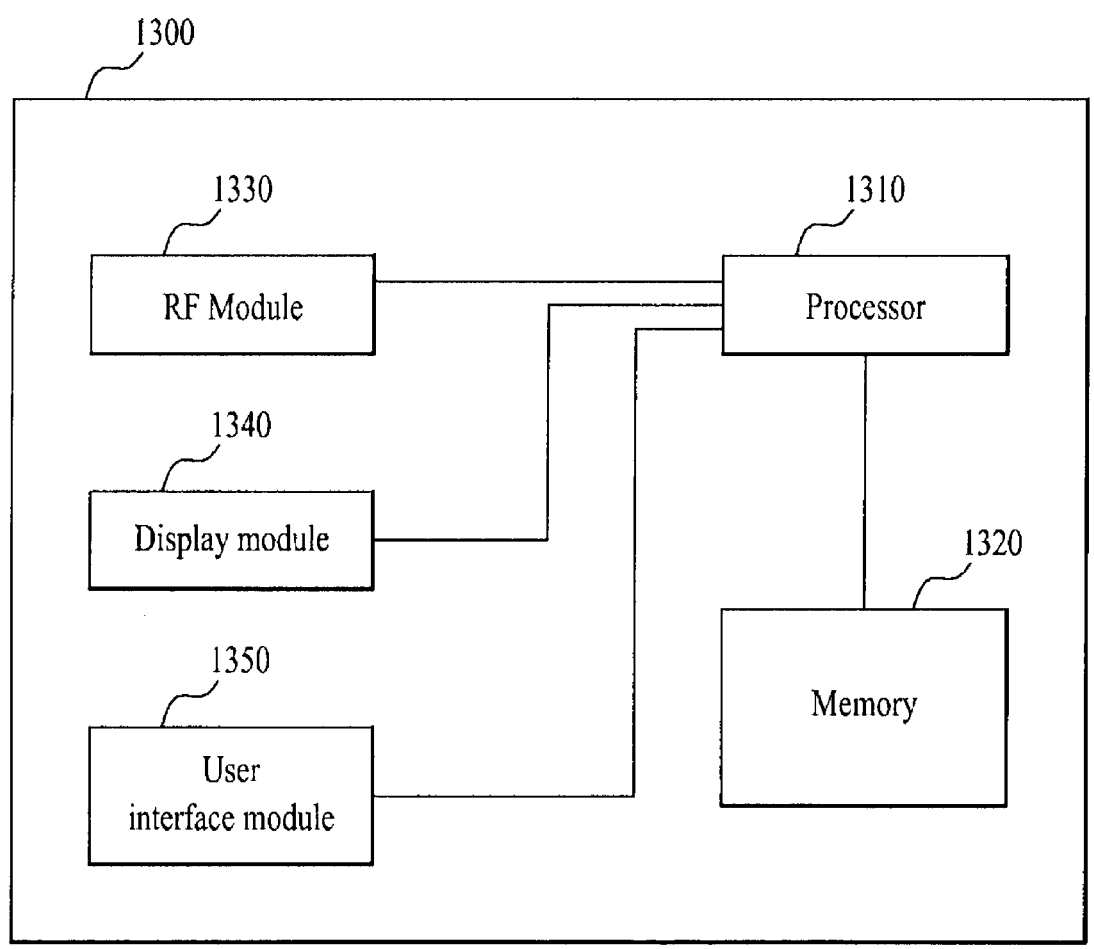
FIG. 13 is a block diagram of a communication apparatus according to an embodiment of the present invention.

FIG. 13 is a block diagram illustrating a communication apparatus in accordance with an embodiment of the present invention.

Referring to FIG. 13, a communication device 1300 includes a processor 1310, a memory 1320, an Radio Frequency (RF) module 1330, a display module 1340, and a user interface module 1350.

The communication device 1300 is illustrated for convenience of the description and some modules may be omitted. Moreover, the communication device 1300 may further include necessary modules. Some modules of the communication device 1300 may be further divided into sub-modules. The processor 1300 is configured to perform operations according to the embodiments of the present invention exemplarily described with reference to the figures. Specifically, for the detailed operations of the processor 1300, reference may be made to the contents described with reference to FIGS. 1 to 12.

The memory 1320 is connected to the processor 1310 and stores operating systems, applications, program code, data, and the like. The RF module 1330 is connected to the processor 1310 and performs a function of converting a baseband signal into a radio signal or converting a radio signal into a baseband signal. For this, the RF module 1330 performs analog conversion, amplification, filtering, and frequency upconversion or inverse processes thereof. The display module 1340 is connected to the processor 1310 and displays various types of information. The display module 1340 may include, but is not limited to, a well-known element such as a Liquid Crystal Display (LCD), a Light Emitting Diode (LED), or an Organic Light Emitting Diode (OLED). The user interface module 1350 is connected to the processor 1310 and may include a combination of well-known user interfaces such as a keypad and a touchscreen.

The above-described embodiments are combinations of elements and features of the present invention in a predetermined manner. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims that are not explicitly dependent on each other can be combined to provide an embodiment or new claims can be added through amendment after the application is filed.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

While the above-described method for reporting timer status information in a wireless communication system has been described centering on an example applied to the 3GPP LTE system, the present invention is applicable to a variety of wireless communication systems in addition to the 3GPP LTE system.

The invention claimed is:

1. A method for reporting TAT (time alignment timer) status information by a user equipment (UE) in a wireless communication system, the method comprising:
  receiving, by the UE, report request information including a report condition for reporting the TAT status information for a plurality of TAGs (time alignment groups) configured for the UE; and
  reporting, by the UE, the TAT status information for the plurality of TAGs to a network whenever the report condition is met,
  wherein the TAT status information indicates whether the TAT for each of the plurality of TAGs is 'running' or 'not running', respectively,
  wherein the report condition comprises a start time of the TAT for a specific TAG among the plurality of TAGs and an expiration time of the TAT for the specific TAG among the plurality of TAGs.

2. The method of claim 1, wherein the report condition further comprises the reception of a command, from the network, for reporting the TAT status information.

3. The method of claim 1, wherein the report condition further comprises a predetermined time before the expiration of the TAT.

4. The method of claim 1, wherein the report condition comprises the reception of TAC (Timing Advance Command) information.

5. The method of claim 1, wherein the TAT status information for the plurality of TAGs includes a TAG identity for the plurality of TAGs.

6. The method of claim 1, wherein reporting the TAT status information comprises reporting the TAT status information periodically.

7. A user equipment (UE) for reporting TAT (time alignment timer) status information in a wireless communication system, the UE comprising:
   a radio frequency (RF) unit; and
   a processor that:
   controls the RF unit to receive report request information including a report condition for reporting the TAT status information for a plurality of TAGs (time alignment groups) configured for the UE; and
   reports the TAT status information for the plurality of TAGs to a network whenever the report condition is met,
   wherein the TAT status information indicates whether the TAT for each of the plurality of TAGs is 'running' or 'not running', respectively,
   wherein the report condition comprises a start time of the TAT for a specific TAG among the plurality of TAGs and an expiration time of the TAT for the specific TAG among the plurality of TAGs.

* * * * *